(12) United States Patent
Yajima et al.

(10) Patent No.: US 8,698,827 B2
(45) Date of Patent: Apr. 15, 2014

(54) DISPLAY CONTROL APPARATUS, DISPLAY CONTROL METHOD, NON-TRANSITORY COMPUTER READABLE RECORDING MEDIUM AND INTEGRATED CIRCUIT

(75) Inventors: Hideaki Yajima, Osaka (JP); Hidehiko Shin, Osaka (JP)

(73) Assignee: Panasonic Corporation, Osaka (JP)

( * ) Notice: Subject to any disclaimer, the term of this patent is extended or adjusted under 35 U.S.C. 154(b) by 175 days.

(21) Appl. No.: 13/388,369

(22) PCT Filed: May 26, 2011

(86) PCT No.: PCT/JP2011/002935
§ 371 (c)(1),
(2), (4) Date: Feb. 1, 2012

(87) PCT Pub. No.: WO2011/152000
PCT Pub. Date: Dec. 8, 2011

(65) Prior Publication Data
US 2012/0127186 A1 May 24, 2012

(30) Foreign Application Priority Data
Jun. 3, 2010 (JP) .................................. 2010-128115

(51) Int. Cl.
*G09G 5/00* (2006.01)
*G09G 5/39* (2006.01)
*G09G 5/36* (2006.01)
*G06F 17/00* (2006.01)
*G06T 11/00* (2006.01)

(52) U.S. Cl.
CPC .................................... *G06T 11/001* (2013.01)
USPC ........... 345/581; 345/630; 345/531; 345/545; 345/204; 715/273

(58) Field of Classification Search
USPC .................. 345/581, 619, 629–630, 531, 536, 345/545–548, 553, 204, 691, 27; 348/552, 348/553, 563, 569, 588; 715/273; 725/40–41, 50; 711/100, 170–173
See application file for complete search history.

(56) References Cited

U.S. PATENT DOCUMENTS 5,528,356 A * 6/1996 Harcourt ....................... 356/73.1
2002/0135585 A1* 9/2002 Dye et al. ...................... 345/531
(Continued)

FOREIGN PATENT DOCUMENTS

JP 4-96098 3/1992
JP 9-311949 12/1997
(Continued)

OTHER PUBLICATIONS

International Search Report issued Aug. 23, 2011 in International (PCT) Application No. PCT/JP2011/002935.

*Primary Examiner* — Wesner Sajous
(74) *Attorney, Agent, or Firm* — Wenderoth, Lind & Ponack, L.L.P.

(57) ABSTRACT

A display control apparatus includes: an updating frequency calculator (42) which obtains an updating frequency of an attribute relating to display of display elements constituting a screen to be displayed on a display section (3) for each of the display elements; an updating frequency-specific storage (44) which holds display content storing areas (441 through 443) that are for storing display contents in displaying the display elements on the display section (3) and that respectively correspond to updating-frequency ranges obtained by dividing an updating frequency in a unit of a predetermined range; a storing area manager (43) which determines the display content storing areas corresponding to the updating-frequency ranges to which the obtained updating frequencies of the attribute respectively belong, as drawing areas of the respective display elements; a drawing section (41) which draws the display contents of the display elements respectively in the display content storing areas determined as the drawing areas; and a combiner (45) which combines contents in the display content storing areas in which the display elements are drawn to display the combined contents on the display section (3).

9 Claims, 12 Drawing Sheets

(56) References Cited

U.S. PATENT DOCUMENTS

2002/0145611 A1* 10/2002 Dye et al. ............... 345/543
2004/0145663 A1* 7/2004 Nishio et al. ............ 348/239
2010/0013757 A1* 1/2010 Ogikubo ................. 345/156

FOREIGN PATENT DOCUMENTS

| JP | 2007-72036 | 3/2007 |
| JP | 2009-192741 | 8/2009 |

* cited by examiner

| DISPLAY ELEMENT NAME | UPDATING FREQUENCY F [TIMES/MIN] | UPDATING TIME |
|---|---|---|
| DISPLAY ELEMENT A | 0 | t1 |
| DISPLAY ELEMENT B | 0 | t1 |
| DISPLAY ELEMENT C | 0 | t1 |

| DISPLAY ELEMENT NAME | UPDATING FREQUENCY F [TIMES/MIN] | UPDATING TIME |
|---|---|---|
| DISPLAY ELEMENT A | 0 | t1 |
| DISPLAY ELEMENT B | 3 | t2 |
| DISPLAY ELEMENT C | 3 | t2 |

| DISPLAY ELEMENT NAME | UPDATING FREQUENCY F [TIMES/MIN] | UPDATING TIME |
|---|---|---|
| DISPLAY ELEMENT A | 0 | t1 |
| DISPLAY ELEMENT B | 0 | t1 |
| DISPLAY ELEMENT C | 3 | t3 |

| RANGE OF UPDATING FREQUENCY F [TIMES/MIN] | DISPLAY CONTENT STORING AREA NAME | DISPLAY CONTENT STORING AREA GENERATION STATE | DISPLAY ELEMENT TO BE DRAWN |
|---|---|---|---|
| $0 \leq F < 1$ | FIRST DISPLAY CONTENT STORING AREA | UNGENERATED | |
| $1 \leq F < 60$ | SECOND DISPLAY CONTENT STORING AREA | UNGENERATED | |
| $60 \leq F$ | THIRD DISPLAY CONTENT STORING AREA | UNGENERATED | |

| RANGE OF UPDATING FREQUENCY F [TIMES/MIN] | DISPLAY CONTENT STORING AREA NAME | DISPLAY CONTENT STORING AREA GENERATION STATE | DISPLAY ELEMENT TO BE DRAWN |
|---|---|---|---|
| $0 \leq F < 1$ | FIRST DISPLAY CONTENT STORING AREA | GENERATED | DISPLAY ELEMENT A, DISPLAY ELEMENT B, DISPLAY ELEMENT C |
| $1 \leq F < 60$ | SECOND DISPLAY CONTENT STORING AREA | UNGENERATED | |
| $60 \leq F$ | THIRD DISPLAY CONTENT STORING AREA | UNGENERATED | |

| RANGE OF UPDATING FREQUENCY F [TIMES/MIN] | DISPLAY CONTENT STORING AREA NAME | DISPLAY CONTENT STORING AREA GENERATION STATE | DISPLAY ELEMENT TO BE DRAWN |
|---|---|---|---|
| $0 \leq F < 1$ | FIRST DISPLAY CONTENT STORING AREA | GENERATED | DISPLAY ELEMENT A, DISPLAY ELEMENT B |
| $1 \leq F < 60$ | SECOND DISPLAY CONTENT STORING AREA | GENERATED | DISPLAY ELEMENT C |
| $60 \leq F$ | THIRD DISPLAY CONTENT STORING AREA | UNGENERATED | |

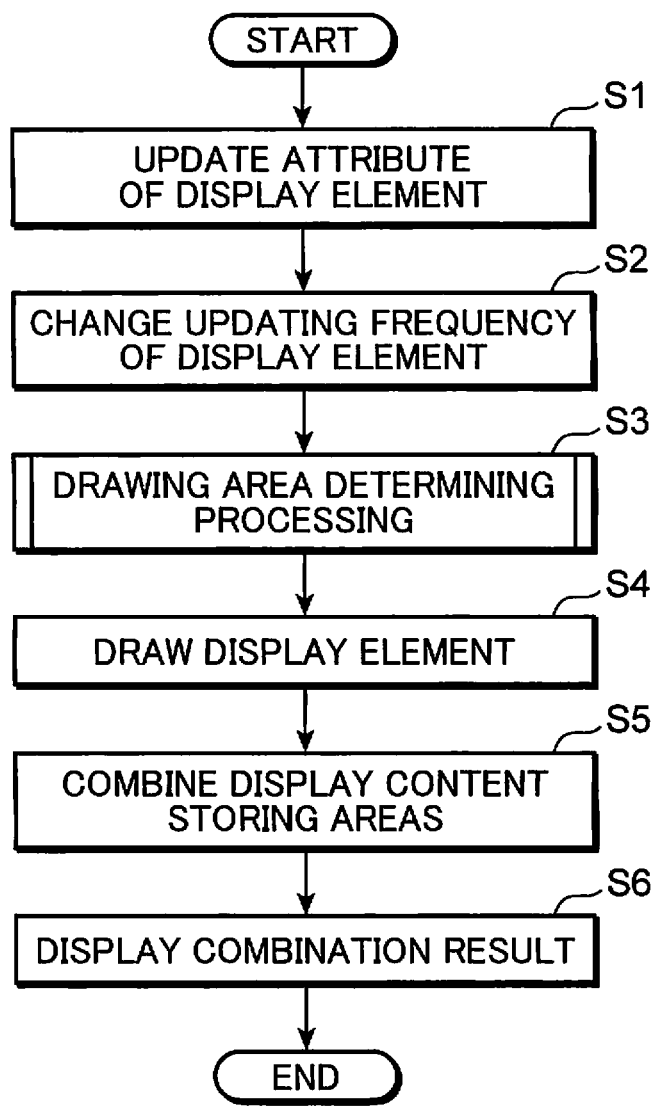

FIG. 8

| RANGE OF UPDATING FREQUENCY F [TIMES/MIN] | DISPLAY CONTENT STORING AREA NAME | DISPLAY CONTENT STORING AREA GENERATION STATE | DISPLAY ELEMENT TO BE DRAWN |
|---|---|---|---|
| $0 \leq F < 1$ | FIRST DISPLAY CONTENT STORING AREA | GENERATED | DISPLAY ELEMENT A |
| $0 \leq F < 1$ | FOURTH DISPLAY CONTENT STORING AREA | GENERATED | DISPLAY ELEMENT B |
| $1 \leq F < 60$ | SECOND DISPLAY CONTENT STORING AREA | GENERATED | DISPLAY ELEMENT C |
| $60 \leq F$ | THIRD DISPLAY CONTENT STORING AREA | UNGENERATED | |

FIG. 9

| RANGE OF UPDATING FREQUENCY F [TIMES/MIN] | DISPLAY CONTENT STORING AREA NAME | DISPLAY CONTENT STORING AREA GENERATION STATE | DISPLAY ELEMENT TO BE DRAWN | DISPLAY POSITION | SHAPE |
|---|---|---|---|---|---|
| 0≦F<1 | FIRST DISPLAY CONTENT STORING AREA | GENERATED | DISPLAY ELEMENT A | Q1(X1,Y1), Q2(X2,Y2) | RECTANGULAR |
| 1≦F<60 | SECOND DISPLAY CONTENT STORING AREA | UNGENERATED | | | |
| 60≦F | THIRD DISPLAY CONTENT STORING AREA | UNGENERATED | | | |

432

| DISPLAY ELEMENT NAME | UPDATING FREQUENCY F [TIMES/MIN] | NUMBER OF TIMES OF UPDATING |
|---|---|---|
| DISPLAY ELEMENT A | 0 | 0 |
| DISPLAY ELEMENT B | 0 | 0 |
| DISPLAY ELEMENT C | F1 | N |

421

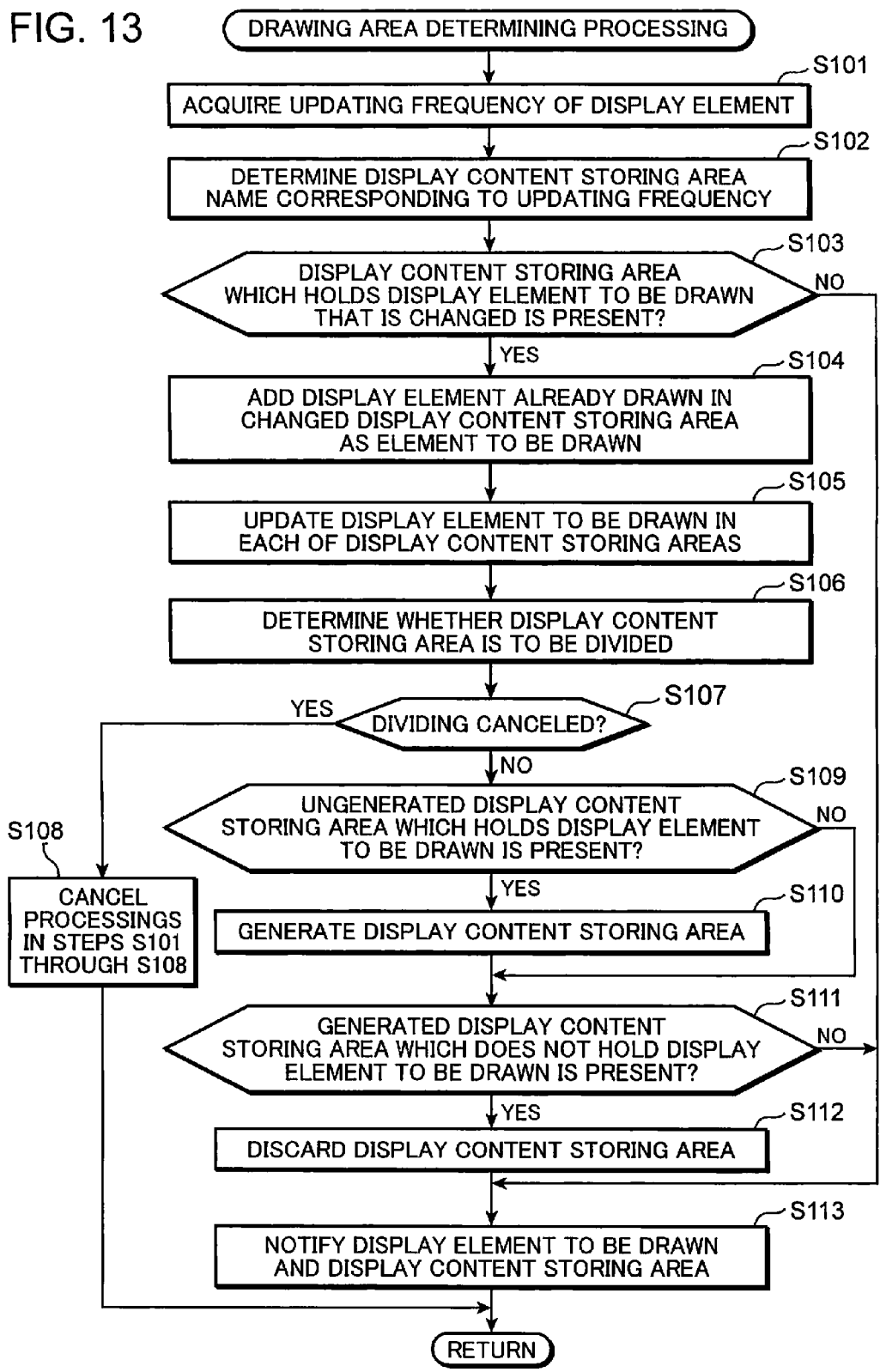

US 8,698,827 B2

DISPLAY CONTROL APPARATUS, DISPLAY CONTROL METHOD, NON-TRANSITORY COMPUTER READABLE RECORDING MEDIUM AND INTEGRATED CIRCUIT

TECHNICAL FIELD

The present invention relates to a technology for controlling screen display on a monitor such as an LCD or a CRT, and more particularly to a display control apparatus, a display control method, a display control program and an integrated circuit for performing a display updating processing at a high speed.

BACKGROUND ART

As a conventional display control apparatus, there has been proposed an arrangement, wherein a display content storing area for storing display contents generally called as a frame buffer or a plane is divided into a display content storing area exclusively used for a moving object to draw a moving object, out of display elements such as characters or images to be displayed on a screen, and a display content storing area exclusively used for a fixed object to draw an unmovable object, and only the display content storing area exclusively used for a moving object is updated in moving a display element such as an animation for enhancing the display updating speed (see e.g. patent literature 1). In the conventional device disclosed in patent literature 1, a display element, whose attribute relating to display such as the display position or the size on a screen is not changed, is drawn in the display content storing area exclusively used for a fixed object, and a display element, whose attribute relating to display is changed, is drawn in the display content storing area exclusively used for a moving object. Then, the display contents in the display content storing area exclusively used for a fixed object and in the display content storing area exclusively used for a moving object are combined for displaying on a display section.

In the above arrangement, in updating the display contents on a screen for displaying an animation, only the contents in the display content storing area exclusively used for a moving object is drawn, while omitting a drawing processing for a fixed object to implement a high-speed display updating processing.

In the conventional arrangement, however, in the case where there is a display element whose attribute relating to display may change, it is necessary to prepare a display content storing area for storing the display element of a moving object. Such a display element includes a display element whose attribute relating to display changes only in a rare condition such as error notification to a user, and whose actual possibility of updating the attribute is low. In addition to the display element whose attribute is hardly updated, in other words, a display element whose attribute relating to display is updated with a long cycle, there is a display element whose attribute relating to display is updated with a short cycle. In the case where there are two kinds of display elements whose updating frequencies of the attribute differ from each other, a display updating processing is performed for a display element whose attribute relating to display is updated with a long cycle, at the same frequency as the frequency for a display element whose attribute relating to display is updated with a short cycle, which may increase a time required for the display updating processing.

CITATION LIST

Patent Literature

Japanese Unexamined Patent Publication No. H09-311949

SUMMARY OF INVENTION

In view of the conventional drawbacks, an object of the invention is to provide a display control apparatus, a display control method, a display control program and an integrated circuit which implement a high-speed display updating processing.

A display control apparatus according to an aspect of the invention includes: an updating frequency calculator which obtains an updating frequency of an attribute relating to display of display elements constituting a screen to be displayed on a display section for each of the display elements; an updating frequency-specific storage which holds display content storing areas that are for storing display contents in displaying the display elements on the display section and that respectively correspond to updating-frequency ranges obtained by dividing an updating frequency in a unit of a predetermined range; a storing area manager which determines the display content storing areas corresponding to the updating-frequency ranges to which the updating frequencies of the attribute obtained for each of the display elements by the updating frequency calculator respectively belong, as drawing areas of the respective display elements; a drawing section which draws the display contents of the respective display elements respectively in the display content storing areas determined as the drawing areas of the respective display elements by the storing area manager; and a combiner which combines contents in the display content storing areas in which the display contents of the respective display elements are drawn to display the combined contents on the display section.

BRIEF DESCRIPTION OF DRAWINGS

FIGS. 2A through 2C are diagrams showing updating frequency information in an updating frequency calculator in the first embodiment of the invention.

FIGS. 3A through 3C are diagrams showing storing area information in a storing area manager in the first embodiment of the invention.

FIG. 4 is a flowchart showing a display processing in the first embodiment of the invention.

FIG. 8 is a diagram showing a storing area information in a storing area manager in the third embodiment of the invention.

FIG. 9 is a diagram showing a storing area information in a storing area manager in a fourth embodiment of the invention.

FIG. 13 is a flowchart showing another example of the drawing area determining processing.

DESCRIPTION OF EMBODIMENTS

In the following, embodiments of the invention are described referring to the accompanying drawings.

First Embodiment

Figure 1:
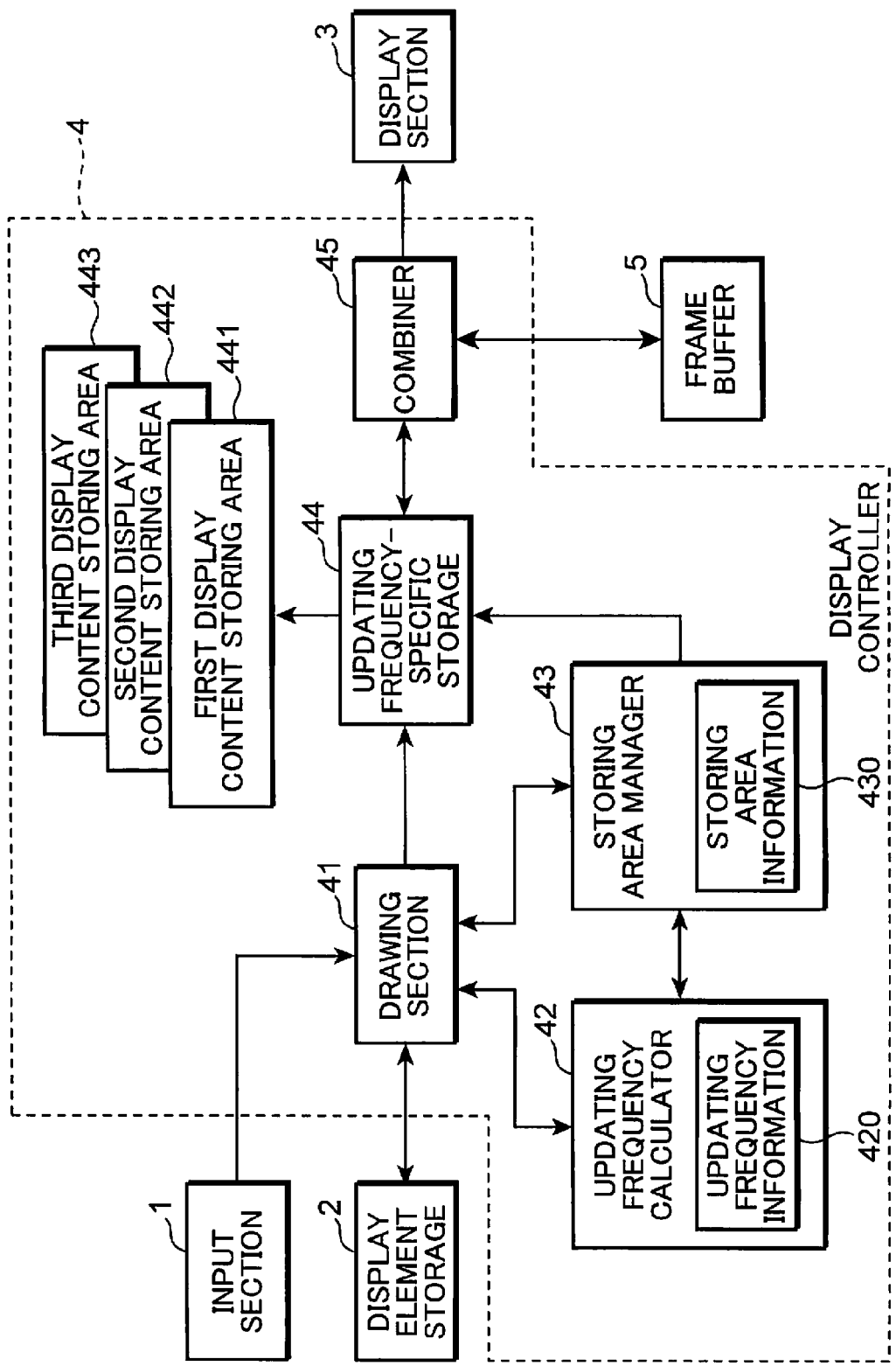
FIG. 1 is a block diagram showing an arrangement of a display apparatus in a first embodiment of the invention.

FIG. 1 is a block diagram showing an arrangement of a display apparatus in the first embodiment of the invention, FIGS. 2A through 2C are diagrams showing the contents of updating frequency information held by an updating frequency calculator, and FIGS. 3A through 3C are diagrams showing the contents of storing area information managed by a storing area manager.

The display apparatus is provided with an input section 1, a display element storage 2, a display section 3, and a display controller 4. The input section 1 accepts an input of user operation, and includes a keyboard and a pointing device. The input section 1 notifies a drawing section 41 in the display controller 4 of an operation result of the user. The display element storage 2 is constituted of e.g. a HD (Hard Disk) or a memory, and stores display elements such as images or characters. The display element constitutes a screen to be displayed on the display section 3. The display element has cohesive content such as a selection button and a determination button on a user operation screen, and functions as a component constituting the display content to be displayed on the display section 3. The display section 3 displays a screen constituted by e.g. an LCD or a CRT, and displays, on the screen, display contents notified from a combiner 45 in the display controller 4. The display controller 4 controls the display section 3 to display the display elements stored in the display element storage 2. The display controller 4 is provided with the drawing section 41, an updating frequency calculator 42, a storing area manager 43, an updating frequency-specific storage 44 and the combiner 45.

Upon receiving an operation result of the user, which has been notified from the input section 1, the drawing section 41 draws a display element such as images or characters stored in the display element storage 2 in a display content storing area held in the updating frequency-specific storage 44. In performing the above operation, the drawing section 41 requests the storing area manager 43 to retrieve a display content storing area as a drawing area of each of the display elements, and draws the display elements in the display content storing areas notified from the storing area manager 43. Further, the drawing section 41 notifies the updating frequency calculator 42 of the name of the display element, whose attribute relating to display such as the color, the size, the coordinate has been changed in accordance with the user operation or the contents of an animation. Furthermore, the drawing section 41 includes a display element which has been notified as a display element to be re-drawn, as a display element to be drawn, in the case where the necessity of a re-drawing processing is notified from the storing area manager 43, because the display content storing area as a drawing area has been changed, even if the display element is not included in the display element to be drawn because the attribute of the display element is not changed.

The updating frequency calculator 42 calculates, for each of the display elements, a frequency at which the contents to be drawn by the drawing section 41 is changed, in other words, a frequency at which the attribute relating to display such as the color, the size, the coordinate is updated, based on a display element such as images or characters. As shown in FIGS. 2A through 2C, the updating frequency calculator 42 holds, in a memory, information correlated to display element names, updating frequencies and updating times as updating frequency information 420 so that the updating frequency calculator 42 can manage the frequency of updating a drawing processing for each of the display elements.

The updating frequency-specific storage 44 holds display content storing areas which respectively correspond to updating-frequency ranges obtained by dividing an updating frequency in a unit of a predetermined range. Each of the display content storing areas holds information for displaying a display element on the display section 3, such as the color, the transparency, Z value of each pixel. Further, the updating frequency-specific storage 44 does not hold a display content storing area in an initial state, and generates or discards a display content storing area, as necessary, in accordance with an instruction of the storing area manager 43. In FIG. 1, first through third display content storing areas 441 through 443 held in the updating frequency-specific storage 44 are shown. In the first embodiment, a capacity capable of holding the display contents on the entirety of the screen of the display section 3, in other words, a memory of the same capacity as the capacity of a frame buffer 5 is secured, as a memory capacity for a display content storing area.

The storing area manager 43 requests the updating frequency-specific storage 44 to generate or discard a display content storing area, based on an updating frequency, which is obtained by the updating frequency calculator 42, of an attribute of a display element such as characters or images stored in the display element storage 2. As shown in FIGS. 3A through 3C, the storing area manager 43 holds, in a memory, a display content storing area name corresponding to each of the updating-frequency ranges, information relating to a generation state as to whether the display content storing area name is held in the updating frequency-specific storage 44, and the name of the display element to be drawn in each of the display content storing areas, as storing area information 430, for each of the updating-frequency ranges.

In the first embodiment, as shown in FIGS. 3A through 3C, there are prepared three frequency ranges i.e. $0 \leq F < 1$, $1 \leq F < 60$, $60 \leq F$, as the ranges of the updating frequency F [times/min], and the three updating-frequency ranges are respectively correlated to the first through third display content storing areas 441 through 443. In this example, the low frequency range ($0 \leq F < 1$) corresponds to e.g. an unmovable or fixed image, or an image to be updated with a long cycle; the intermediate frequency range ($1 \leq F < 60$) corresponds to an image to be updated with an intermediate cycle e.g. a cursor image to be moved by a user operation; and the high frequency range ($60 \leq F$) corresponds to an image to be updated with a short cycle e.g. an animation image. The ranges of the updating frequency F shown in FIGS. 3A through 3C are mere examples, and the updating frequency F may be divided based on a value other than the above. In FIGS. 3A through 3C, the updating frequency F is divided into three updating-frequency ranges. Alternatively, the updating frequency F may be divided into two or more than three ranges.

As shown in FIG. 3A, the updating-frequency range, the display content storing area name, and the display content storing area generation state respectively have predetermined values as an initial value. However, no value is set as an initial value for a display element to be drawn in each of the display content storing areas; and values are set as shown in FIGS.

3B, 3C, a drawing area determining processing to be described later is performed. Further, the storing area manager 43 notifies the drawing section 41 of a display element which is required to be re-drawn, when the display content storing area as a drawing area of a display element is changed in response to a change in the updating frequency.

The combiner 45 combines the contents in all the display content storing areas held in the updating frequency-specific storage 44 for displaying the combined contents on the display section 3. Specifically, as described above, display elements are drawn in all the display content storing areas held in the updating frequency-specific storage 44 since the updating frequency-specific storage 44 generates or discards a display content storing area in response to an instruction from the storing area manager 43. In view of this, the combiner 45 combines the contents in all the display content storing areas (in other words, all the display content storing areas in which the display elements are drawn) held in the updating frequency-specific storage 44. Then, the combiner 45 draws the combined contents in the frame buffer 5, and displays the contents drawn in the frame buffer 5 on the display section 3. The frame buffer 5 may be provided in the display section 3.

FIG. 4 is a flowchart showing a display processing to be performed by the display apparatus shown in FIG. 1. Firstly, in the case where a user operation is notified from the input section 1 to the drawing section 41, or in the case where the display contents are automatically updated at a certain interval e.g. in an animation display, at a drawing start point of time in each of the frames, the drawing section 41 updates an attribute value of each of the display elements stored in the display element storage 2 in accordance with the user operation or the contents of animation, sets a display element whose attribute has been updated as a display element to be drawn, and notifies the updating frequency calculator 42 of the attribute updating (Step S1).

More specifically, in the case where an initial screen is displayed in response to a user operation, default values at the time of initial display are set for the attribute such as the color, the coordinate, the size of all the display elements to be displayed on the display section 3, and all the names of the initially displayed display elements are notified to the updating frequency calculator 42. Then, in the case where a focus position is changed in response to a user operation notified from the input section 1, or in the case where the coordinate of a display element is changed at a certain interval for animation display such as scrolling, the attribute of the display element, whose display contents is required to be changed for focus position changing or for scrolling, is changed, out of the display elements displayed on the display section 3; and all the names of the changed display elements are notified to the updating frequency calculator 42. In the notification, the display elements whose attribute relating to display of display elements has not been changed, and whose display contents is retained unchanged are not included in the display elements to be drawn. In the case where the attribute of all the display elements is not changed, the updating frequency calculator 42 may be notified that the attribute has not been changed.

Subsequently, upon receiving a notification from the drawing section 41 of the name of the display element whose attribute has been changed, the updating frequency calculator 42 changes the updating frequency corresponding to the name of the notified display element (Step S2). More specifically, upon receiving a notification from the drawing section 41 of the name of the display element whose attribute has been updated, the updating frequency calculator 42 estimates an updating frequency in the future, based on the number of times by which the attribute has been changed for a past predetermined period before the point of time of notification, and holds the estimated value as an updating frequency.

In the following, a concrete behavior is exemplarily described referring to FIGS. 2A through 2C. Firstly, no value is stored in the updating frequency information 420 of the updating frequency calculator 42 in an initial state. In this example, for initial display, upon receiving a notification from the drawing section 41 of attribute updating of a display element A, a display element B, a display element C, as shown in FIG. 2A, the updating frequency calculator 42 adds the names of the display elements A, B, C as the notified display elements in the updating frequency information 420, sets the updating frequency to 0, and stores a point of time t1 at which the updating frequency is set to 0. Then, upon receiving a notification from the drawing section 41 that only the attribute of the display elements B, C has been updated for changing the display contents in response to e.g. a user operation, the updating frequency calculator 42 calculates updating frequencies of all the display elements held in the updating frequency information 420, based on the previously updated point of time and the currently updated point of time. For instance, in the case where ten seconds have elapsed form the previously updated point of time t1 to a currently updated point of time t2, the updating frequency F of the display elements B, C is F=6 [times/min], and the updating frequency F of the display element A is F=0 [time/min]. Lastly, an average of the currently calculated value and the updating frequency that has been recorded in the updating frequency information 420 is calculated, and the calculated average is set in the updating frequency information 420 as an estimated value of updating frequency in the future. In the case of the aforementioned example, as shown in FIG. 2B, the updating frequency of the display elements B, C is F=3 [times/min], and the updating frequency of the display element A is F=0 [time/min].

Subsequently, the drawing section 41 requests the storing area manager 43 to retrieve a display content storing area as a drawing area of each of the display elements to be displayed on the display section 3 (Step S3). Specifically, the storing area manager 43 is notified of a list of the names of display elements whose attribute relating to display has been updated, and which have been set as display elements to be drawn in Step S1 by the drawing section 41. Upon receiving the notification, the storing area manager 43 replies to the drawing section 41 of the names of the display elements which are determined to be display elements to be drawn by the storing area manager 43 itself, and the list of the names of the display content storing areas as drawing areas of the respective display elements. The details of a drawing area determining processing to be performed by the storing area manager 43 will be described later.

Subsequently, the drawing section 41 draws the display elements described in the list notified from the storing area manager 43 in the display content storing areas held in the updating frequency-specific storage 44 in accordance with the display content storing area names designated for each of the display elements (Step S4). Thereafter, the combiner 45 combines the contents in all the display content storing areas held in the updating frequency-specific storage 44 (Step S5). Lastly, the result of combination by the combiner 45 is displayed on the display section 3 (Step S6).

Figure 5:
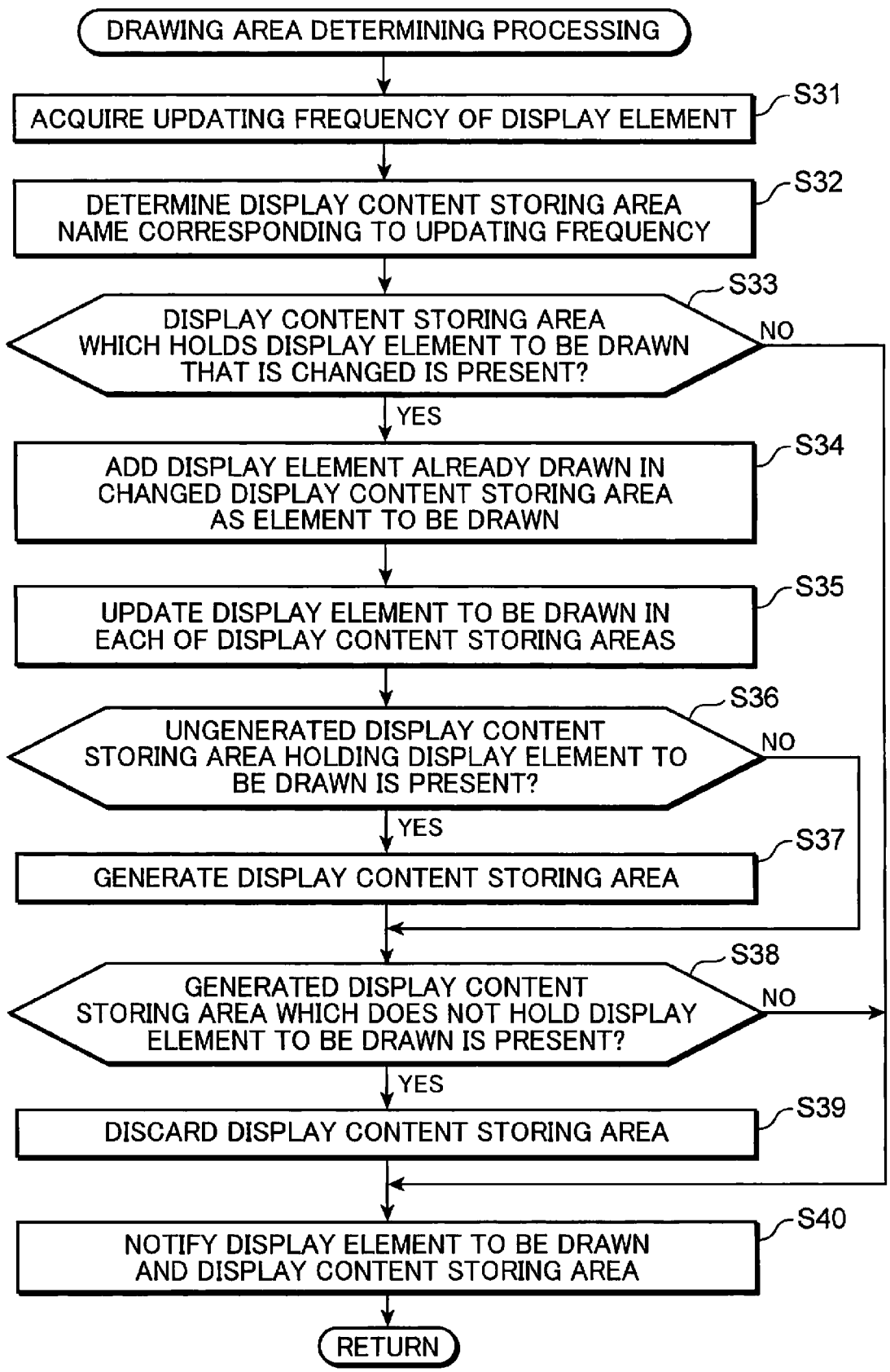
FIG. 5 is a flowchart showing a drawing area determining processing in the first embodiment of the invention.

Next, the drawing area determining processing to be performed by the storing area manager 43 is described. FIG. 5 is a flowchart showing the drawing area determining processing of Step S3 in FIG. 4. In the following, referring to FIG. 5, there are described firstly a flow of operation to be performed at the time of initial drawing processing, secondly a flow of operation to be performed in the case where the updating frequency of a display element is changed, and the display content storing area as a drawing area is divided for a re-drawing processing, thirdly a flow of operation to be performed in the case where a part of display elements is re-drawn at the same updating frequency, and lastly a flow of operation to be performed in the case where the updating frequency of a display element is changed, and the display content storing areas as drawing areas are combined for a re-drawing processing.

Firstly, a flow of operation to be performed at the time of initial drawing processing is described. Upon receiving a list of the names of display elements to be drawn from the drawing section 41, the storing area manager 43 acquires, from the updating frequency calculator 42, the updating frequency of each of the display elements described in the list (Step S31). At the time of initial drawing processing, all the display elements A, B, C to be displayed on the display section 3 are described in the list, and all the display elements are not updated at the time of initial drawing processing. Accordingly, as shown in FIG. 2A, the updating frequency F=0 [time/min] is acquired for the display elements A, B, C.

Subsequently, the storing area manager 43 retrieves, from the storing area information 430, a display content storing area name corresponding to the updating frequency acquired in Step S31, for each of the display elements described in the list of the names of the display elements to be drawn, which has been notified from the drawing section 41 (Step S32). In an initial state that the storing area information 430 shown in FIG. 3A is held, the first display content storing area 441 (see FIG. 1) is retrieved along with the display elements A, B, C whose updating frequency is F=0 [time/min].

Then, the storing area manager 43 compares between the display element to be drawn in each of the display content storing areas recorded in the storing area information 430, and the display element in each of the display content storing areas retrieved in Step S32 to determine whether there exist display content storing areas storing display elements to be drawn which differ from each other (Step S33). In the case where it is determined that there exist display content storing areas storing display elements to be drawn which differ from each other (YES in Step S33), the storing area manager 43 adds a display element which is described as a display element to be drawn in the changed display content storing area in the storing area information 430, as a display element to be drawn (Step S34).

As shown in FIG. 3A, at the time of initial display, there is no display element to be drawn in the first display content storing area 441, in which the display elements A, B, C are to be drawn. Accordingly, it is determined that the display elements to be drawn in the first display content storing area 441 differ from each other (YES in Step S33), and the display element drawn in the changed first display content storing area 441 is added as a display element to be drawn (Step S34). However, at this time, as shown in FIG. 3A, since there is no display element drawn in the first display content storing area 441, actually no display element is added as a display element to be drawn. On the other hand, in the case where it is determined that there do not exist display content storing areas storing display elements to be drawn which differ from each other (NO in Step S33), the routine proceeds to Step S40. However, at the time of initial display, the display content storing areas always store display elements to be drawn which differ from each other. Therefore, the determination result in Step S33 is always affirmative.

Next, the storing area manager 43 updates a "DISPLAY ELEMENT TO BE DRAWN" in the storing area information 430 (Step S35). At this time, it is determined that all the display elements A, B, C are drawn in the first display content storing area 441 in Step S32, as shown in FIG. 3B, the display elements A, B, C are added to the "DISPLAY ELEMENT TO BE DRAWN" in the first display content storing area 441.

Subsequently, the storing area manager 43 judges whether there is an ungenerated display content storing area which holds a display element to be drawn (Step S36). In the case where it is judged that there is an ungenerated display content storing area (YES in Step S36), the storing area manager 43 requests the updating frequency-specific storage 44 to generate a display content storing area corresponding to the ungenerated display content storing area, and changes the "DISPLAY CONTENT STORING AREA GENERATION STATE" in the storing area information 430 to a generated state (Step S37). At this time, the updating frequency-specific storage 44 secures a memory area for storing the display contents, as a display content storing area. In the case where it is judged that there is no ungenerated display content storing area which holds a display element to be drawn (NO in Step S36), Step S37 is omitted, and the routine proceeds to Step S38. At this time, the display elements A, B, C are drawn in the first display content storing area 441, which has been determined to be in an ungenerated state in the initial state. Accordingly, the first display content storing area 441 is generated (Step S37), and as shown in FIG. 3B, the generation state of the first display content storing area 441 is changed to a generated state.

Subsequently, the storing area manager 43 judges whether there is a generated display content storing area which does not hold a display element to be drawn (Step S38). In the case where it is judged that there is a generated display content storing area which does not hold a display element to be drawn (YES in Step S38), the storing area manager 43 requests the updating frequency-specific storage 44 to discard the generated display content storing area, and changes the display content storing area generation state in the storing area information 430 to an ungenerated state (Step S39). At this time, the updating frequency-specific storage 44 releases a memory area which has been secured for storing a display element, as a display content storing area.

On the other hand, in the case where it is judged that there is no generated display content storing area which does not hold a display element to be drawn (NO in Step S38), Step S39 is omitted, and the routine proceeds to Step S40. At the time of initial display, as shown in FIG. 3B, there is no generated display content storing area which does not hold a display element to be drawn. Therefore, the judgment result in Step S38 is negative, and the routine proceeds to Step S40.

Lastly, the storing area manager 43 notifies the drawing section 41 of a display element to be drawn, and a display content storing area as a drawing area of each of the display elements (Step S40), and then, the processing is ended. At this time, the display elements A, B, C are notified as display elements to be drawn, and the first display content storing area 441 is notified as a display content storing area in which each of the display elements are drawn.

Next, there is described a flow of operation to be performed, in the case where the updating frequency of a display element is changed, and the display content storing area as a drawing area is divided (in other words, the drawing area is changed to another ungenerated display content storing area), and a display element is re-drawn. In the following, an example is described, wherein, from the state shown in FIG. 2A, only the display element C is re-drawn and the updating frequency becomes F=3 [times/min] as shown in FIG. 2C.

Firstly, upon receiving a notification from the drawing section 41 of the display element C as a display element to be drawn, the storing area manager 43 acquires the updating frequency F=3 [times/min] of the display element C from the updating frequency calculator 42 (Step S31). Then, the storing area manager 43 retrieves the second display content storing area 442 as a drawing area of the display element C, referring to the storing area information 430 (Step S32). Then, the storing area manager 43 judges presence or absence of a display content storing area, in which a display element to be drawn is changed (Step S33). At this time, the drawing area of the display element C has been changed from the first display content storing area 441 to the second display content storing area 442. Accordingly, it is judged that there is a change in the first display content storing area 441 and in the second display content storing area 442 (YES in Step S33), and the display elements drawn in the first display content storing area 441 and in the second display content storing area 442 are added as display elements to be drawn (Step S34). At this time, the display elements A, B are drawn in the first display content storing area 441, and no display element is drawn in the second display content storing area 442. Accordingly, the display elements A, B are added as display elements to be drawn.

Subsequently, the storing area manager 43 updates the "DISPLAY ELEMENT TO BE DRAWN" in each of the display content storing areas in the storing area information 430 in accordance with the contents selected in Step S32 (Step S35). At this time, the display element C is drawn in the second display content storing area 442. Accordingly, as shown in FIG. 3C, the "DISPLAY ELEMENT TO BE DRAWN" is updated. Specifically, the description position of the display element C is changed from the updating-frequency range: $0 \leq F < 1$ to the updating-frequency range: $1 \leq F < 60$. Then, the storing area manager 43 judges presence or absence of an ungenerated display content storing area which holds a display element to be drawn (Step S36). At this time, the second display content storing area 442 in which the display element C is drawn is not generated (YES in Step S36). Accordingly, the storing area manager 43 requests the updating frequency-specific storage 44 to generate the second display content storing area 442, and as shown in FIG. 3C, changes the generation state of the second display content storing area 442 to a generated state (Step S37). The updating frequency-specific storage 44 generates the requested second display content storing area 442. Then, the storing area manager 43 judges presence or absence of an ungenerated display content storing area which does not hold a display element to be drawn (Step S38). As shown in FIG. 3C, there is no such display content storing area (NO in Step S38), the routine proceeds to Step S40.

Lastly, the storing area manager 43 notifies the drawing section 41 of the display elements A, B, C as display elements to be drawn, which have been determined in Step S34, the first display content storing area 441 as a drawing area of the display elements A, B, and the second display content storing area 442 as a drawing area of the display element C (Step S40). Upon receiving the notification, the drawing section 41 draws the display elements A, B in the first display content storing area 441, and draws the display element C in the second display content storing area 442 (Step S4 in FIG. 4), and the combiner 45 combines the contents in the first display content storing area 441 and in the second display content storing area 442 to display the combined contents on the display section 3 (Steps S5, S6 in FIG. 4).

Next, there is described a flow of operation to be performed, in the case where a part of display elements is re-drawn at the same updating frequency. As shown in FIG. 2C, an example is described, wherein the display element C is re-drawn at the same updating frequency F=3 [times/min] as in the previous drawing processing.

Firstly, upon receiving a notification from the drawing section 41 of the display element C as a part of a list of display elements to be drawn, the storing area manager 43 acquires the updating frequency F=3 [times/min] of the display element C from the updating frequency calculator 42 (Step S31). Then, the storing area manager 43 retrieves the second display content storing area 442 as a drawing area of the display element C, referring to the storing area information 430 (Step S32). Then, the storing area manager 43 judges presence or absence of a display content storing area, in which there is a change concerning a "DISPLAY ELEMENT TO BE DRAWN" (Step S33). At this time, since there is no change in the updating frequency, it is judged that that there is no display content storing area to be changed (NO in Step S33), and the routine proceeds to Step S40. Lastly, the storing area manager 43 notifies the drawing section 41 of the display element C which has been notified as a display element to be drawn from the drawing section 41, and the second display content storing area 442 as a drawing area (Step S40). Upon receiving the notification, the drawing section 41 draws the display element C in the second display content storing area 442 (Step S4 in FIG. 4); and the combiner 45 combines the contents in the first display content storing area 441 and in the second display content storing area 442 to display the combined contents on the display section 3 (Steps S5, S6 in FIG. 4).

Lastly, there is described a flow of operation to be performed, in the case where the updating frequency of a display element is changed, and display content storing areas as drawing areas are integrated (in other words, a drawing area is changed to another generated display content storing area), and a display element is re-drawn. An example is described, wherein, in the state shown in FIG. 3C, the updating frequency of the display element C drops to: F=0.1 [time/min].

Firstly, upon receiving a notification from the drawing section 41 of the display element C as a part of a list of display elements to be drawn, the storing area manager 43 acquires the updating frequency F=0.1 [time/min] of the display element C from the updating frequency calculator 42 (Step S31). Then, the storing area manager 43 retrieves the first display content storing area 441 as a drawing area of the display element C, referring to the storing area information 430 (Step S32).

Then, the storing area manager 43 judges presence or absence of a display content storing area, in which there is a change concerning a display element to be drawn (Step S33). At this time, the drawing area of the display element C is changed from the second display content storing area 442 to the first display content storing area 441. Accordingly, the storing area manager 43 judges that there is a change in the first display content storing area 441 and in the second display content storing area 442 (YES in Step S33), and adds the display elements drawn in the first display content storing area 441 and in the second display content storing area 442 as display elements to be drawn (Step S34). At this time, the display elements A, B are drawn in the first display content storing area 441, and the display element C is drawn in the second display content storing area 442. Accordingly, the display elements A, B, C are added as display elements to be drawn. Since the display element C has already been set as a display element to be drawn, the display element C is not added at this time.

Subsequently, the storing area manager 43 updates the display element to be drawn in each of the display content storing areas in accordance with the contents selected in Step S32 (Step S35). At this time, the display element C is drawn in the first display content storing area 441. Accordingly, as shown in FIG. 3B, the "DISPLAY ELEMENT TO BE DRAWN" is updated. Specifically, the description position of the display element C is changed from the updating-frequency range: $1 \leq F < 60$ to the updating-frequency range: $0 \leq F < 1$. Then, the storing area manager 43 judges presence or absence of an ungenerated display content storing area which holds a display element to be drawn (Step S36). At this time, the storing area manager 43 judges that there is no ungenerated display content storing area (NO in Step S36), and the routine proceeds to Step S38.

Then, the storing area manager 43 judges presence or absence of a generated display content storing area which does not hold a display element to be drawn (Step S38). At this time, the storing area of the display element C is changed from the second display content storing area 442 to the first display content storing area 441. Accordingly, the storing area manager 43 judges that there is no display element in the second display content storing area 442 (YES in Step S38), and requests the updating frequency-specific storage 44 to discard the second display content storing area 442, and changes the generation state of the second display content storing area 442 to an ungenerated state (Step S39). Upon receiving the request, the updating frequency-specific storage 44 discards the second display content storing area 442 as requested, and releases the memory area. Lastly, the storing area manager 43 notifies the drawing section 41 of the display elements A, B, C as display elements to be drawn, which have been determined in Step S34, and the first display content storing area 441 as a drawing area of all the display elements (Step S40). Upon receiving the notification, the drawing section 41 draws the display elements A, B in the first display content storing area 441 (Step S4 in FIG. 4), and the combiner 45 displays the contents in the first display content storing area 441 on the display section 3 (Steps S5, S6 in FIG. 4).

As described above, in the first embodiment, in drawing the display elements stored in the display element storage 2 by the drawing section 41, the updating frequency calculator 42 obtains the updating frequency of the attribute of each of the display elements, and the drawing section 41 draws each of the display elements in the display content storing area corresponding to the updating-frequency range to which the updating frequency of the attribute of each of the display elements belongs. With this arrangement, it is possible to perform only a drawing processing into a required display content storing area in accordance with an actual updating frequency, thereby implementing a high-speed display updating processing.

Further, in the first embodiment, the storing area manager 43 requests the updating frequency-specific storage 44 to dynamically generate or discard a required display content storing area corresponding to an obtained updating frequency. With this arrangement, it is possible to secure only a required display content storing area corresponding to an updating frequency, thereby suppressing the memory capacity consumed as a display content storing area. Further, the above arrangement allows for omitting an unwanted combining processing, which is more advantageous in implementing a high-speed display updating processing.

Second Embodiment

Figure 6:
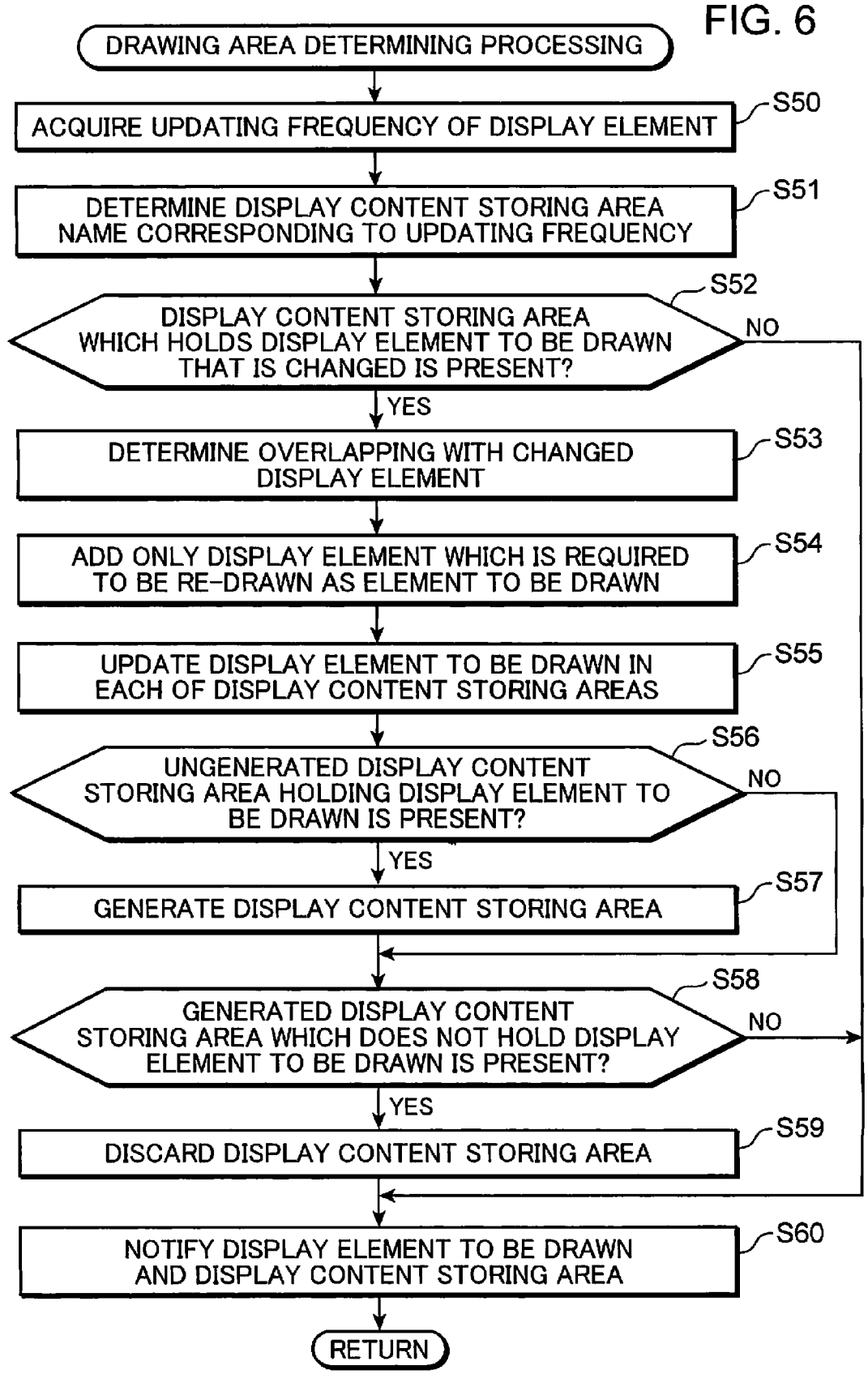
FIG. 6 is a flowchart showing a drawing area determining processing in a second embodiment of the invention.

FIG. 6 is a flowchart showing a drawing area determining processing to be performed by a storing area manager 43 in the second embodiment. In the first embodiment, in Step S34 in FIG. 5, in the case where there is a change concerning a display element to be drawn in a display content storing area, all the display elements drawn in the display content storing area are added as display elements to be drawn. In other words, in the case where the display condition is changed from the state shown in FIG. 3C to the state shown in FIG. 3B, the storing area manger 43 adds both the display elements A and B drawn in the first display content storing area 441, as display elements to be drawn. In the second embodiment, it is judged whether there is overlapping between display elements, and only a display element which is overlapped and which is required to be re-drawn is added as a display element to be drawn. In the following, the second embodiment is described, mainly focusing on the features of the second embodiment different from the features of the first embodiment.

Referring to FIG. 6, Steps S50 through S52, and Steps S55 through S60 are the same as Steps S31 through S33, and Steps S35 through S40 in FIG. 5. In the case where the judgment result in Step S52 is affirmative, the storing area manager 43 judges whether there is overlapping between display elements, based on the coordinate or the size of the changed display element in the display content storing area (Step S53). Then, only a display element which is required to be re-drawn, because the display element is drawn at a position overlapping the position of the changed display element, is added as a display element to be drawn (Step S54). Specifically, for instance, in the case where the display condition is changed from the state shown in FIG. 3C to the state shown in FIG. 3B, the storing area manager 43 judges whether there is overlapping between the display elements A, B drawn in the first display content storing area 441 and the display element C, and adds, out of the display elements A, B, only a display element drawn at a position overlapping the position of the display element C, as a display element to be drawn.

In the second embodiment, only a display element which is required to be re-drawn because of overlapping is added as a display element to be drawn. Thus, the above arrangement is more advantageous in implementing a high-speed display updating processing, as compared with the first embodiment, in which overlapping judgment is not performed.

Third Embodiment

Figure 7:
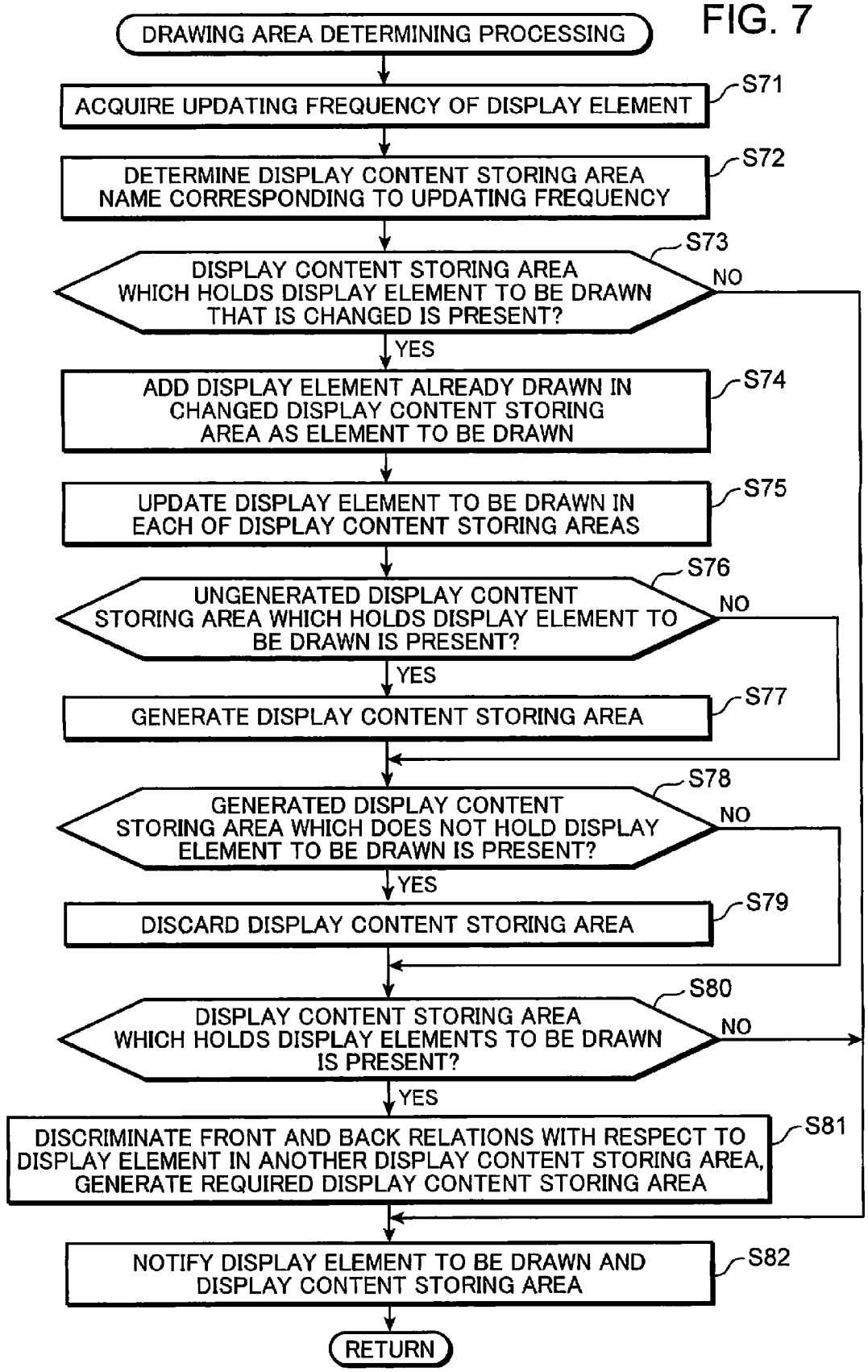
FIG. 7 is a flowchart showing a drawing area determining processing in a third embodiment of the invention.

FIG. 7 is a flowchart showing a drawing area determining processing to be performed by a storing area manager 43 in the third embodiment. FIG. 8 is a diagram showing a storing area information 431 to be held by the storing area manager 43 in the third embodiment. The arrangement of the third embodiment is substantially the same as the arrangement of the first embodiment shown in FIG. 1. In the following, the third embodiment is described, mainly focusing on the features of the third embodiment different from the features of the first embodiment.

In the first embodiment, the drawing section 41 and the combiner 45 discriminate the front and back relations between display elements, using a Z-buffer, and draw all the display elements belonging to the same updating frequency concerning the attribute in one display content storing area. In the third embodiment, a drawing section 41 and a combiner 45 draw and combine display elements, using a Z-sorting method which requires changing the order of drawing in accordance with the front and back relations between display elements, without using a Z-buffer. In view of the above, a storing area manager 43 further divides a display content storing area, in the case where two display elements belonging to one updating-frequency range should be individually drawn at front and back positions with respect to a display element to be drawn in a display content storing area corresponding to an updating-frequency range other than the one updating-frequency range.

Referring to FIG. 7, Steps S71 through S79 are respectively the same as Steps S31 through S39 in FIG. 5 except for the following. Specifically, in the case where the judgment result in Step S73 is negative, the routine proceeds to Step S82; and in the case where the judgment result in Step S78 is negative, the routine proceeds to Step S80. Subsequent to Step S79, the storing area manager 43 judges whether there is a display content storing area which holds a plurality of display elements to be drawn (Step S80). In the case where it is judged that there is no such display content storing area (NO in Step S80), the routine proceeds to Step S82. On the other hand, in the case where it is judged that there is a display content storing area which holds a plurality of display elements to be drawn (YES in Step S80), the storing area manager 43 discriminates the front and back relations of these display elements with respect to a display element in another display content storing area, and requests an updating frequency-specific storage 44 to generate a required display content storing area (Step S81).

Specifically, in the case where the display condition is changed to the state shown in FIG. 3C (YES in Step S80), the storing area manager 43 individually discriminates the front and back relations of the display elements A, B which belong to one updating-frequency range, and the display element C which belongs to an updating-frequency range different from the one updating-frequency range. In other words, the storing area manager 43 discriminates the front and back relations between the display element A and the display element C, and discriminates the front and back relations between the display element B and the display element C. Then, in the case where it is discriminated that the front and back relations between the display element A and the display element C, and the front and back relations between the display element B and the display element C differ from each other, for instance, in the case where the display element A is located at a front position with respect to the display element C, and the display element B is located at a back position with respect to the display element C, a display content storing area corresponding to the one updating-frequency range is further generated (Step S81). Specifically, as shown in FIG. 8, the storing area manager 43 requests the updating frequency-specific storage 44 to generate a fourth display content storing area, in addition to the first display content storing area, as a display content storing area corresponding to the updating-frequency range: 0≤F<1. Step S82 that follows Step S81 is the same as Step S40 in FIG. 5.

In the third embodiment, in the case where a plurality of display elements whose front and back relations with respect to a display element belonging to a certain updating-frequency range differ from each other belong to an updating-frequency range other than the certain updating-frequency range, a plurality of display content storing areas are generated. This is advantageous in allowing the drawing section 41 and the combiner 45 to properly perform a drawing processing and a combining processing of the display elements respectively, using a Z-sorting method.

Fourth Embodiment

Figures 10, 11:
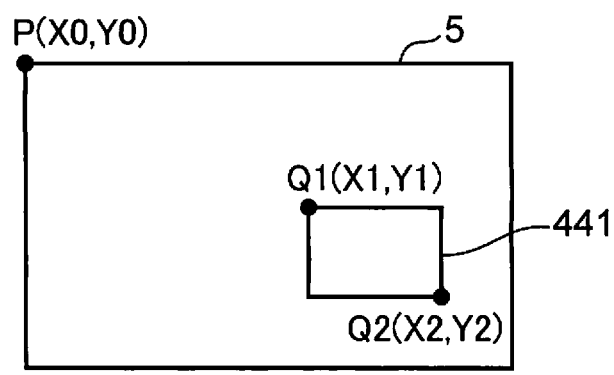
FIG. 10 is a diagram showing a frame buffer in the fourth embodiment of the invention.
FIG. 11 is a diagram showing another example of an updating frequency information in the updating frequency calculator.

FIG. 9 is a diagram showing a storing area information 432 held in a storing area manager 43 in a fourth embodiment, and FIG. 10 is a diagram showing a frame buffer 5 in the fourth embodiment, specifically, a diagram for describing a combining processing to be performed by a combiner 45. The arrangement of a display apparatus in the fourth embodiment is substantially the same as described in the first embodiment referring to FIG. 1. Further, the basic flow of processing in the fourth embodiment is substantially the same as in the first embodiment described referring to FIGS. 4, 5. In the following, the fourth embodiment is described, mainly focusing on the features of the fourth embodiment different from the features of the first embodiment.

In the first embodiment, there is secured a memory of a capacity capable of holding the display contents on the entirety of the screen of the display section 3 (in other words, the same capacity as the frame buffer 5), as a memory capacity for display content storing areas. In the fourth embodiment, there is secured a requisite minimum capacity capable of storing drawing areas of display elements to be drawn in display content storing areas, and in a combining processing to be performed by a combiner 45, combining is performed taking into account an offset processing as to which position on the screen of a display section 3 a display element in each of the display content storing areas is to be displayed.

Specifically, for instance, as shown in FIG. 9, in the case where a display element A is set as a display element to be drawn, a storing area manager 43 acquires information relating to e.g. the size, the shape of a drawing area of the display element A, and the drawing position of the display element A on the display section 3. Then, the storing area manager 43 requests an updating frequency-specific storage 44 to generate a first display content storing area 441 of a capacity in accordance with the size of the drawing area of the display element A. Further, the storing area manager 43 holds, as the storing area information 432, information relating to e.g. the shape and the drawing position of the display element A (the first display content storing area 441). Then, the storing area manager 43 notifies the combiner 45 of the information relating to e.g. the shape and the drawing position of the display element A (the first display content storing area 441) via the updating frequency-specific storage 44.

As shown in FIG. 10, the combiner 45 performs a combining processing by drawing the contents in the first display content storing area 441 into a frame buffer 5, based on the information relating to e.g. the shape and the drawing position of the display element A (the first display content storing area 441). Specifically, the combiner 45 performs a combining processing, taking into account information relating to e.g. the shape (a rectangular shape in FIG. 9 and FIG. 10) of the display element A (the first display content storing area 441), an uppermost and leftmost coordinate Q1 (X1, Y1), a lowermost and rightmost coordinate Q2 (X2, Y2), and an uppermost and leftmost coordinate P (X0, Y0) in the frame buffer 5.

In the fourth embodiment, the updating frequency-specific storage 44 secures a memory capacity in accordance with the size of a drawing area of a display element, as a display content storing area. Accordingly, as compared with the first embodiment, the fourth embodiment is advantageous in suppressing a memory consumption amount required for a display content storing area. Therefore, even in the case where the number of updating-frequency ranges to be divided is increased, it is possible to suppress a memory capacity required for a display content storing area. In the fourth embodiment, the storing area manager 43 notifies the combiner 45 of information relating to e.g. a drawing position of the display element A (the first display content storing area 441) via the updating frequency-specific storage 44. Alternatively, the information may be directly notified to the combiner 45.

Others

In the first embodiment, the updating frequency calculator 42 obtains an average between a currently calculated updating frequency, and a previous updating frequency that has already been recorded in the updating frequency information 420. Alternatively, a weighting may be applied to each of a previous value and a current value so that it can be set which one of the previous value and the current value is emphasized. Further alternatively, in the case where a previous updating frequency is: F=0 [time/min], a current value may be set as an updating frequency, without obtaining an average. Further alternatively, in the case where a difference between a previous updating frequency and a current updating frequency is not smaller than a predetermined threshold value, it is judged that the display condition has been changed, and only the current value may be used without obtaining an average.

Figure 12:
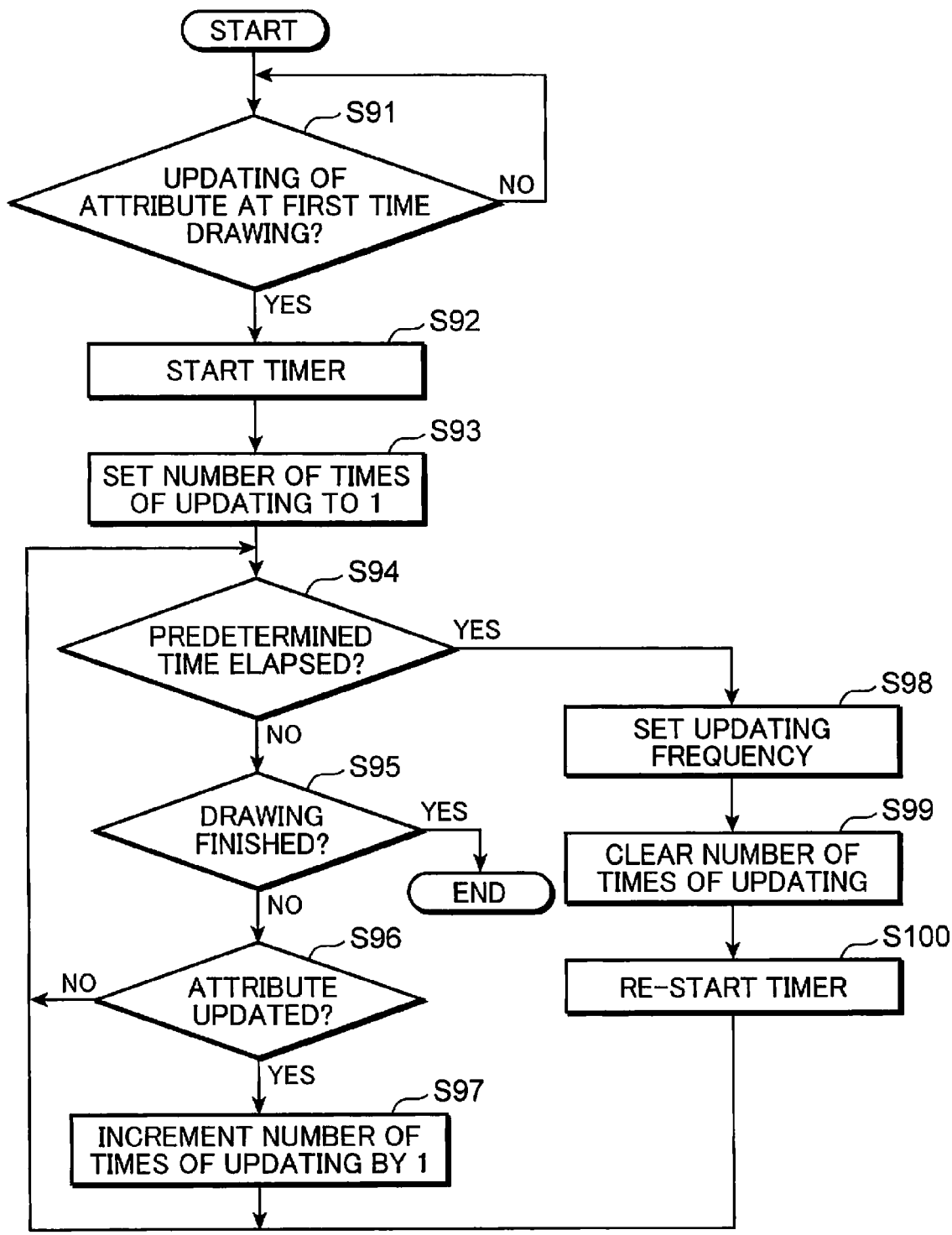
FIG. 12 is a flowchart showing another example of the updating frequency determining processing to be performed by the updating frequency calculator.

Further, in the first embodiment, the updating frequency calculator 42 estimates an updating frequency in the future, based on actual values in the past. Alternatively, an updating frequency may be determined, using only actual values in the past. In the modification, as shown in FIG. 11, an area for holding the number of times of updating is provided in an updating frequency information 421, and an updating frequency calculator 42 has a timer function of alerting that a predetermined time T has elapsed. FIG. 12 is a flowchart showing another example of the updating frequency determining processing to be performed by the updating frequency calculator 42. The operation shown in FIG. 12 is performed independently of the processing shown in FIG. 4, in place of Step S2 shown in FIG. 4.

Referring to FIG. 12, in the case where an attribute is updated (Step S1 shown in FIG. 4) at the time of performing a drawing processing for the first time (YES in Step S91), a timer which alerts that a predetermined time T has elapsed is started (Step S92), and the number of times of updating a display element (the display element C in FIG. 11) which has been updated is set to one (Step S93). Then, in the case where the drawing processing has not been ended (NO in Step S95) during a next period of time until the predetermined time T has elapsed, and the attribute has been updated by performing a re-drawing processing (YES in Step S96), the number of times of updating the display element which has been updated is incremented by one (Step S97), and the routine returns to Step S94. On the other hand, in the case where the drawing processing has been ended (YES in Step S95), the above processing is ended; and in the case where a drawing processing is not performed (NO in Step S96), the routine returns to Step S94.

Thereafter, in the case where the timer which has been started at time of performing a drawing processing for the first time alerts that the predetermined time T has elapsed (YES in Step S94), the updating frequency is set to: F1=(N/T) by dividing the recorded number N of times of updating by the predetermined time T (Step S98). Lastly, the number of times of updating is cleared to zero (Step S99), the timer is restarted (Step S100), and the routine returns to Step S94, whereby the above processing is repeated.

In the above modification, an average may be obtained using a previously set updating frequency in the same manner as the first embodiment. Further alternatively, a weight may be applied to each of the values; or only a latest value may be used exclusively in the case where the display condition has been changed, without obtaining an average.

Further, in the first embodiment, an updating frequency is held for each of the display elements in the updating frequency information 420. Alternatively, a certain number of display elements may be defined as a group of display elements, and an updating frequency may be held for each of the groups. Further alternatively, the name of a display element may be an ID specifying the display element or a pointer (the address of a display element storage 2 in which the display element is stored) indicating the data. Further, in the first embodiment, for instance, as shown in FIG. 2A, the updating times are held for each of the display elements. Alternatively, a certain number of display elements may be held for each of the updating times.

Further, in the first embodiment, all the display content storing areas are dynamically generated or discarded. Alternatively, it is possible to define a display content storing area having a high possibility of use in advance, e.g. a display content storing area (in the first embodiment, the first display content storing area 441) serving as a drawing area of a display element having an updating frequency: F=0 [time/min], as an already generated display content storing area in an initial state to exclude the generated display content storing area from display content storing areas which may be discarded.

Further, in the first embodiment, in Steps S38, S39 in FIG. 5, in the case where there is a display content storing area which does not hold a display element to be drawn, the display content storing area is immediately discarded. Alternatively, in a condition that the updating frequency is changed immediately after discarding a display content storing area, and the display content storing area is regenerated, it is possible to discard the display content storing area at a timing upon lapse of a predetermined time after confirming that there is no display element to be drawn.

Further, in the first embodiment, the updating frequency calculator 42 determines the updating frequency by dynamically detecting a change in the attribute of a display element. Alternatively, in the case where it is clear that a display element is updated at a fixed updating interval from start to finish, such as an animation display, the drawing section 41 may set an updating frequency of a display element in the updating frequency information 420 held by the updating frequency calculator 42 to a value suitable for the animation display, and may clear the set value at the time of finishing the animation display.

Further, in the first embodiment, one storing area information 430 and one updating frequency information 420 are prepared, based on the premise that display elements are updated on one screen of the display section 3. Alternatively, in the case where display elements to be displayed on the screen of the display section 3 are switched over by e.g. transition of screens, the storing area information 430 and the updating frequency information 420 may be prepared for each of the screens, and the storing area information 430 and the updating frequency information 420 may be switched over in accordance with the screen transition. At the time of screen transition, a display content storing area held in the updating frequency-specific storage 44 is discarded, and the display content storing area generation state in the storing area information 430 is changed to an ungenerated state. The information other than the above may be retained unchanged, and may be used again, in the case where the same screen is displayed again.

Further, in the first embodiment, in the case where the updating frequency of the attribute of a display element belongs to an updating-frequency range other than the existing updating-frequency range, the display content area storing area is divided (in other words, another display content storing area is generated) in any case. The invention is not limited to the above. FIG. 13 is a flowchart showing another example of the drawing area determining processing to be performed by the storing area manager 43.

Referring to FIG. 13, Steps S101 through S105 are the same as Steps S31 through S35 in FIG. 5. After determining a drawing area of each of the display elements in Step S105, it is judged whether the display content storing area is to be divided (Step S106). In performing the above operation, in the case where the number of display elements to be drawn in the display content storing area corresponding to the low updating-frequency range is smaller than a predetermined number, it is possible to determine that a high-speed processing is secured by performing a re-drawing processing while including the display elements whose updating frequency belongs to the low frequency range, rather than by performing a dividing processing and then a combining processing (in other words, after drawing a display element in another display content storing area, combining the display elements) (YES in Step S107); cancel the processings in Steps S31 through S35; and suspend the dividing processing (Step S108). In the case where the dividing processing is not canceled (NO in Step S107), the routine proceeds to Step S109. Steps S109 through S113 are the same as Steps S36 through S40 in FIG. 5.

In Steps S106, S107, it is also possible to suspend the dividing processing, in the case where not only the number of display elements to be drawn in a display content storing area corresponding to the low updating-frequency range, but also the sum of drawing areas or the sum of drawing processing times of a display element to be drawn in a display content storing area are smaller than respective predetermined values. Further alternatively, it is also possible to measure a time for drawing the display elements in a display content storing area, and a time for combining the display content storing areas for displaying; calculate a drawing processing time to perform the dividing that has been judged in Step S105 based on the measured times; and interrupt the dividing processing, in the case where the calculated drawing processing time is not shorter than the drawing processing time required for the case where the dividing processing is not performed, by a predetermined time or more.

Further, in the foregoing embodiments, functional blocks i.e. the drawing section 41, the updating frequency calculator 42, the storing area manager 43, the updating frequency-specific storage 44 and the combiner 45 are typically implemented as an LSI i.e. an integrated circuit. These functional blocks may be individually formed into a one-chip device, or a part or all of the functional blocks may be formed into a one-chip device.

In this example, the integrated circuit is an LSI. The integrated circuit may also be called as an IC, a system LSI, a super LSI or an ultra LSI, depending on the degree of integration.

Further alternatively, the method of manufacturing the integrated circuit is not limited to an LSI method. The integrated circuit may be implemented by a dedicated circuit or a general-purpose processor. After fabricating an LSI, an FPGA (Field Programmable Gate Array) capable of programming, or a reconfigurable processor capable of reconfiguring connection or setting of circuit cells within the LSI may also be used.

Further, if an integration circuit technology substantially equivalent to the LSI technology is developed in the future by the progress of semiconductor technology or by another technology derived from the semiconductor technology, it is needless to say that the functional blocks may be integrated using such technology. The application of the biotechnology or the like is a possibility.

The integrated circuit for implementing the functional blocks i.e. the drawing section 41, the updating frequency calculator 42, the storing area manager 43, the updating frequency-specific storage 44 and the combiner 45 may be used by being connected to e.g. an information processing apparatus equipped with the input section 1, the display element storage 2, the display section 3, display content storing areas (e.g. the first through third display content storing areas 441 through 443) and the frame buffer 5.

As a concrete application example of the display apparatus shown in FIG. 1, there is proposed an arrangement that the contents to be displayed on the screen of a TV (the display section 3) is updated with use of e.g. a remote controller for a TV or a recorder.

The aforementioned embodiments mainly include the invention having the following arrangements. Specifically, a display control apparatus according to an aspect of the invention includes: an updating frequency calculator which obtains an updating frequency of an attribute relating to display of display elements constituting a screen to be displayed on a display section for each of the display elements; an updating frequency-specific storage which holds display content storing areas that are for storing display contents in displaying the display elements on the display section and that respectively correspond to updating-frequency ranges obtained by dividing an updating frequency in a unit of a predetermined range; a storing area manager which determines the display content storing areas corresponding to the updating-frequency ranges to which the updating frequencies of the attribute obtained for each of the display elements by the updating frequency calculator respectively belong, as drawing areas of the respective display elements; a drawing section which draws the display contents of the respective display elements respectively in the display content storing areas determined as the drawing areas of the respective display elements by the storing area manager; and a combiner which combines contents in the display content storing areas in which the display contents of the respective display elements are drawn to display the combined contents on the display section.

In the above arrangement, the updating frequencies of the attribute relating to display are obtained for each of the display elements, and the display contents of the respective display elements are drawn in the display content storing areas corresponding to the updating-frequency ranges to which the updating frequencies of the attribute respectively belong. This allows for performing only a requisite minimum drawing processing in accordance with an updating frequency, and allows for performing a high-speed display updating processing.

In the display control apparatus, preferably, the drawing section updates the attribute in a case where the display contents in displaying the display elements on the display section are changed.

In the above arrangement, since the attribute relating to display is updated when the display contents in displaying the display elements on the display section are changed, the updating frequencies of the attribute correspond to the frequencies at which the display contents of the display elements are changed. This allows for obtaining updating frequencies at which the respective display elements are required to be drawn by obtaining the updating frequencies of the attribute for each of the display elements.

In the display control apparatus, preferably, the storing area manager requests the updating frequency-specific storage to generate the display content storing area, in a case where the display content storing area corresponding to the updating-frequency range to which the updating frequency of the attribute obtained by the updating frequency calculator belongs is not held in the updating frequency-specific storage, and the storing area manager requests the updating frequency-specific storage to discard the display content storing area corresponding to the updating-frequency range, in a case where the updating frequency of the attribute belonging to the corresponding updating-frequency range is not obtained by the updating frequency calculator, the display content storing area being one of the display contents storing areas held in the updating frequency-specific storage.

In the above arrangement, a display content storing area corresponding to an updating-frequency range to which an obtained updating frequency of the attribute belongs is generated, and a display content storing area whose updating frequency of the attribute belonging to a corresponding updating-frequency range is not obtained is discarded. This allows for suppressing a storage capacity consumed as a display content storing area to a requisite minimum amount.

In the display control apparatus, preferably, the updating frequency-specific storage holds, as the display content storing areas, one display content storing area corresponding to one updating-frequency range, and another display content storing area corresponding to another updating-frequency range, the storing area manager judges, in a case where a drawing area of one display element is changed from the one display content storing area to the another display content storing area, presence or absence of overlapping between the one display element and another display element stored in the one display content storing area, judges presence or absence of overlapping between the one display element and another display element stored in the another display content storing area, and notifies the drawing section of a display element which is required to be re-drawn because of the overlapping, and the drawing section re-draws, in the display content storing area as a drawing area, only the display element which is notified from the storing area manager and which is required to be re-drawn, out of the another display elements stored in the one display content storing area and in the another display content storing area.

In the above arrangement, in the case where a drawing area of one display element is changed from one display content storing area to another display content storing area, only the display element, which is required to be re-drawn because of overlapping between the one display element and one of another display elements respectively stored in the one display content storing area and in the another display content storing area, is re-drawn in the display content storing area. This is advantageous in reducing a time required for a display updating processing, as compared with a case where all the other display elements are re-drawn in the respective display content storing areas without judgment on presence or absence of overlapping.

In the display control apparatus, preferably, the updating frequency-specific storage holds, as the display content storing areas, a first display content storing area which corresponds to a first updating-frequency range, a second display content storing area which corresponds to the first updating-frequency range and is different from the first display content storing area, and a third display content storing area which corresponds to a second updating-frequency range which is different from the first updating-frequency range, the updating frequency calculator obtains an updating frequency of an attribute of each of the display elements, the display elements including a first display element, a second display element and a third display element, in a case where both the updating frequency of the attribute of the first display element and the updating frequency of the attribute of the second display element belong to the first updating-frequency range, and the updating frequency of the attribute of the third display element belongs to the second updating-frequency range, the storing area manager: determines the third display content storing area as a drawing area of the third display element, discriminates front and back relations of the first display element and the second display element with respect to the third display element, and determines, in a case where the front and back relations of the first display element and the second display element with respect to the third display element differ from each other, one of the first display content storing area and the second display content storing area, as a drawing area of the first display element, and determines the other of the first display content storing area and the second display content storing area, as a drawing area of the second display element.

In the above arrangement, in the case where the front and back relations of the first display element and the second display element with respect to the third display element differ from each other, for instance, in the case where the first display element is located at a front position with respect to the third display element, and the second display element is located at a back position with respect to the third element, one of the first and second display content storing areas is determined as a drawing area of the first display element, and the other of the first and second display content storing areas is determined as a drawing area of the second display element. Further, the third display content storing area is determined as a drawing area of the third display element. In other words, the first through third display elements are respectively drawn in display content storing areas different from each other. Accordingly, even in the case where there is adopted a configuration requiring a change in the order of drawing the display elements in accordance with the front and back relations, e.g., a configuration of drawing the display elements in the order from the back position, it is possible to properly combine the contents in the respective display content storing areas, because the first through third display elements are respectively drawn in the display content storing areas different from each other.

In the display control apparatus, preferably, the display content storing areas have a requisite minimum capacity capable of storing the display contents of the display elements, the storing area manager acquires position information in the display section in displaying the display elements on the display section, based on the attribute of the display elements, and notifies the combiner of the position information, and the combiner combines the contents in the display content storing areas, using the position information notified from the storing area manager.

In the above arrangement, the display content storing areas have a requisite minimum capacity capable of storing the display contents of the display elements. This allows for suppressing a storage capacity consumed as a display content storing area, as compared with the case where a device has a storage capacity capable of storing the display contents of the entirety of a screen of a display section. This allows for suppressing an increase in the storage capacity consumed as a display content storing area, even if the number of updating-frequency ranges to be divided is increased.

A display control method according to another aspect of the invention includes: an updating frequency calculating step of obtaining an updating frequency of an attribute relating to display of display elements which constitute a screen to be displayed on a display section for each of the display elements; a storing area preparing step of preparing display content storing areas which are for storing display contents in displaying the display elements on the display section and respectively correspond to updating-frequency ranges obtained by dividing an updating frequency in a unit of a predetermined range; a storing area managing step of determining the display content storing areas corresponding to the updating-frequency ranges to which the updating frequencies of the attribute obtained for each of the display elements in the updating frequency calculating step respectively belong, as drawing areas of the respective display elements; a drawing step of drawing the display contents of the respective display elements respectively in the display content storing areas determined as the drawing areas of the respective display elements in the storing area managing step; and a combining step of combining contents in the display content storing areas in which the display contents of the respective display elements are drawn to display the combined contents on the display section.

In the above arrangement, the updating frequencies of the attribute relating to display are obtained for each of the display elements, and the display contents of the respective display elements are drawn in the display content storing areas corresponding to the updating-frequency ranges to which the updating frequencies of the attribute respectively belong. This allows for performing only a requisite minimum drawing processing in accordance with an updating frequency, and allows for performing a high-speed display updating processing.

A display control program according to yet another aspect of the invention causes a computer to function as: an updating frequency calculator which obtains an updating frequency of an attribute relating to display of display elements constituting a screen to be displayed on a display section for each of the display elements; an updating frequency-specific storage which holds display content storing areas that are for storing display contents in displaying the display elements on the display section and that respectively correspond to updating-frequency ranges obtained by dividing an updating frequency in a unit of a predetermined range; a storing area manager which determines the display content storing areas corresponding to the updating-frequency ranges to which the updating frequencies of the attribute obtained for each of the display elements by the updating frequency calculator respectively belong, as drawing areas of the respective display elements; a drawing section which draws the display contents of the respective display elements respectively in the display content storing areas determined as the drawing areas of the respective display elements by the storing area manager; and a combiner which combines contents in the display content storing areas in which the display contents of the respective display elements are drawn to display the combined contents on the display section.

In the above arrangement, the updating frequencies of the attribute relating to display are obtained for each of the display elements, and the display contents of the respective display elements are drawn in the display content storing areas corresponding to the updating-frequency ranges to which the updating frequencies of the attribute respectively belong. This allows for performing only a requisite minimum drawing processing in accordance with an updating frequency, and allows for performing a high-speed display updating processing.

An integrated circuit according to still another aspect of the invention includes: an updating frequency calculating circuit which obtains an updating frequency of an attribute relating to display of display elements constituting a screen to be displayed on a display section for each of the display elements; a storing area managing circuit which determines display content storing areas corresponding to updating-frequency ranges to which the updating frequencies of the attribute obtained for each of the display elements by the updating frequency calculating circuit respectively belong, as drawing areas of the respective display elements, the display content storing areas being adapted for storing display contents in displaying the display elements on the display section, the display content storing areas respectively corresponding to the updating-frequency ranges obtained by dividing an updating frequency in a unit of a predetermined range; a drawing circuit which draws the display contents of the respective display elements respectively in the display content storing areas determined as the drawing areas of the respective display elements by the storing area managing circuit; and a combining circuit which combines contents in the display content storing areas in which the display contents of the respective display elements are drawn to display the combined contents on the display section.

In the above arrangement, the updating frequencies of the attribute relating to display are obtained for each of the display elements, and the display contents of the respective display elements are drawn in the display content storing areas corresponding to the updating-frequency ranges to which the updating frequencies of the attribute respectively belong. This allows for performing only a requisite minimum drawing processing in accordance with an updating frequency, and allows for performing a high-speed display updating processing.

According to the invention, display contents of display elements are drawn in display content storing areas corresponding to updating-frequency ranges to which the updating frequencies of an attribute relating to display of the display elements constituting a screen to be displayed on a display section respectively belong. This allows for implementing a high-speed display updating processing by merely performing a drawing processing into a display content storing area which requires updating in accordance with an actual updating frequency of display contents.

INDUSTRIAL APPLICABILITY

The display control apparatus, display control method, display control program and integrated circuit according to a present invention are useful as e.g. a display control equipment for updating a part of display contents on a screen by e.g. animation display or a user operation.

The invention claimed is:
1. A display control apparatus, comprising:
an updating frequency calculator which obtains an updating frequency of an attribute relating to display of display elements constituting a screen to be displayed on a display section for each of the display elements;
an updating frequency-specific storage which holds display content storing areas that are for storing display contents in displaying the display elements on the display section and that respectively correspond to updating-frequency ranges obtained by dividing an updating frequency in a unit of a predetermined range;
a storing area manager which determines the display content storing areas corresponding to the updating-frequency ranges to which the updating frequencies of the attribute obtained for each of the display elements by the updating frequency calculator respectively belong, as drawing areas of the respective display elements;
a drawing section which draws the display contents of the respective display elements respectively in the display content storing areas determined as the drawing areas of the respective display elements by the storing area manager; and a combiner which combines contents in the display content storing areas in which the display contents of the respective display elements are drawn to display the combined contents on the display section.

2. The display control apparatus according to claim 1, wherein the drawing section updates the attribute in a case where the display contents in displaying the display elements on the display section are changed.

3. The display control apparatus according to claim 1, wherein the storing area manager requests the storage for each updating frequency to generate the display content storing area, in a case where the display content storing area corresponding to the updating frequency range to which the updating frequency of the attribute obtained by the updating frequency calculator belongs is not held in the storage for each updating frequency, and the storing area manager requests the storage for each updating frequency to discard the display content storing area corresponding to the updating frequency range, in a case where the updating frequency of the attribute belonging to the corresponding updating frequency range is not obtained by the updating frequency calculator, the display content storing area being one of the display contents storing areas held in the storage for each updating frequency.

4. The display control apparatus according to claim 1, wherein the storage for each updating frequency holds, as the display content storing areas, one display content storing area corresponding to one updating frequency range, and another display content storing area corresponding to another updating frequency range, the storing area manager judges, in a case where a drawing area of one display element is changed from the one display content storing area to the another display content storing area, presence or absence of overlapping between the one display element and another display element stored in the one display content storing area, judges presence or absence of overlapping between the one display element and another display element stored in the another display content storing area, and notifies the drawing section of a display element which is required to be re-drawn because of the overlapping, and the drawing section re-draws, in the display content storing area as a drawing area, only the display element which is notified from the storing area manager and which is required to be re-drawn, out of the another display elements stored in the one display content storing area and in the another display content storing area.

5. The display control apparatus according to claim 1, wherein the updating frequency-specific storage holds, as the display content storing areas, a first display content storing area which corresponds to a first updating-frequency range, a second display content storing area which corresponds to the first updating-frequency range and is different from the first display content storing area, and a third display content storing area which corresponds to a second updating-frequency range which is different from the first updating-frequency range, the updating frequency calculator obtains an updating frequency of an attribute of each of the display elements, the display elements including a first display element, a second display element and a third display element, in a case where both the updating frequency of the attribute of the first display element and the updating frequency of the attribute of the second display element belong to the first updating-frequency range, and the updating frequency of the attribute of the third display element belongs to the second updating-frequency range, the storing area manager:

determines the third display content storing area as a drawing area of the third display element, discriminates front and back relations of the first display element and the second display element with respect to the third display element, and determines, in a case where the front and back relations of the first display element and the second display element with respect to the third display element differ from each other, one of the first display content storing area and the second display content storing area, as a drawing area of the first display element, and determines the other of the first display content storing area and the second display content storing area, as a drawing area of the second display element.

6. The display control apparatus according to claim 1, wherein the display content storing areas have a requisite minimum capacity capable of storing the display contents of the display elements, the storing area manager acquires position information in the display section in displaying the display elements on the display section, based on the attribute of the display elements, and notifies the combiner of the position information, and the combiner combines the contents in the display content storing areas, using the position information notified from the storing area manager.

7. A display control method, comprising:

an updating frequency calculating step of obtaining, with an updating frequency calculator, an updating frequency of an attribute relating to display of display elements which constitute a screen to be displayed on a display section for each of the display elements;

a storing area preparing step of preparing display content storing areas, in an updating frequency-specific storage, which are for storing display contents in displaying the display elements on the display section and respectively correspond to updating-frequency ranges obtained by dividing an updating frequency in a unit of a predetermined range;

a storing area managing step of determining, with a storing area manager, the display content storing areas corresponding to the updating-frequency ranges to which the updating frequencies of the attribute obtained for each of the display elements in the updating frequency calculating step respectively belong, as drawing areas of the respective display elements;

a drawing step of drawing, with a drawing section, the display contents of the respective display elements respectively in the display content storing areas determined as the drawing areas of the respective display elements in the storing area managing step; and a combining step of combining, with a combiner, contents in the display content storing areas in which the display contents of the respective display elements are drawn to display the combined contents on the display section.

8. A non-transitory computer readable recording medium storing a display control program which causes a computer to function as:

an updating frequency calculator which obtains an updating frequency of an attribute relating to display of display elements constituting a screen to be displayed on a display section for each of the display elements;

an updating frequency-specific storage which holds display content storing areas that are for storing display contents in displaying the display elements on the display section and that respectively correspond to updating-frequency ranges obtained by dividing an updating frequency in a unit of a predetermined range;

a storing area manager which determines the display content storing areas corresponding to the updating-frequency ranges to which the updating frequencies of the attribute obtained for each of the display elements by the updating frequency calculator respectively belong, as drawing areas of the respective display elements;

a drawing section which draws the display contents of the respective display elements respectively in the display content storing areas determined as the drawing areas of the respective display elements by the storing area manager; and a combiner which combines contents in the display content storing areas in which the display contents of the respective display elements are drawn to display the combined contents on the display section.

9. An integrated circuit, comprising:

an updating frequency calculating circuit which obtains an updating frequency of an attribute relating to display of display elements constituting a screen to be displayed on a display section for each of the display elements;

a storing area managing circuit which determines display content storing areas corresponding to updating-frequency ranges to which the updating frequencies of the attribute obtained for each of the display elements by the updating frequency calculating circuit respectively belong, as drawing areas of the respective display elements, the display content storing areas being adapted for storing display contents in displaying the display elements on the display section, the display content storing areas respectively corresponding to the updating-frequency ranges obtained by dividing an updating frequency in a unit of a predetermined range;

a drawing circuit which draws the display contents of the respective display elements respectively in the display content storing areas determined as the drawing areas of the respective display elements by the storing area managing circuit; and a combining circuit which combines contents in the display content storing areas in which the display contents of the respective display elements are drawn to display the combined contents on the display section.

* * * * *